United States Patent [19]

Jager

[11] Patent Number: 5,569,093
[45] Date of Patent: Oct. 29, 1996

[54] HOLLOW PLASTIC PIN WITH VARYING WALL THICKNESS

[76] Inventor: Arnold Jager, Gehrbergsweg 6, 31303 Burgdorf, Germany

[21] Appl. No.: 459,116

[22] Filed: Jun. 2, 1995

[30] Foreign Application Priority Data

Oct. 5, 1994 [DE] Germany .................. 44 35 569.6

[51] Int. Cl.$^6$ .................................................. A63D 9/00
[52] U.S. Cl. ........................................ 473/118; 473/119
[58] Field of Search ........................... 473/118, 119, 473/120, 121, 122; 273/67 R, 72 R, 72 A

[56] References Cited

U.S. PATENT DOCUMENTS 3,971,837   7/1976   Hasegawa et al. ................. 473/119

FOREIGN PATENT DOCUMENTS 4007086   12/1964   Netherlands ..................... 473/118

Primary Examiner—William M. Pierce
Attorney, Agent, or Firm—Robert W. Becker & Associates

[57] ABSTRACT

A plastic pin, including a bowling pin, for bowling lanes, and a method of making the same. The pin has a hard shell that surrounds a core of cellular and/or porous material. The shell has a lower bulging portion, thereabove a neck-like reduced diameter portion and thereabove an again slightly wider head. The shell has a wall thickness that from the greatest diameter part of the bulging portion increases gradually both upwardly toward the reduced diameter portion and downwardly toward a base of the pin. The plastic for the core of the pin is introduced into the hollow interior of the shell and fills at least a portion thereof by expansion. The core plastic is introduced at such a temperature that an inner surface of the plastic shell is softened at least at some locations by contact with the introduced core plastic to thereby effect fusion between the plastic of the shell and the introduced core plastic.

8 Claims, 1 Drawing Sheet

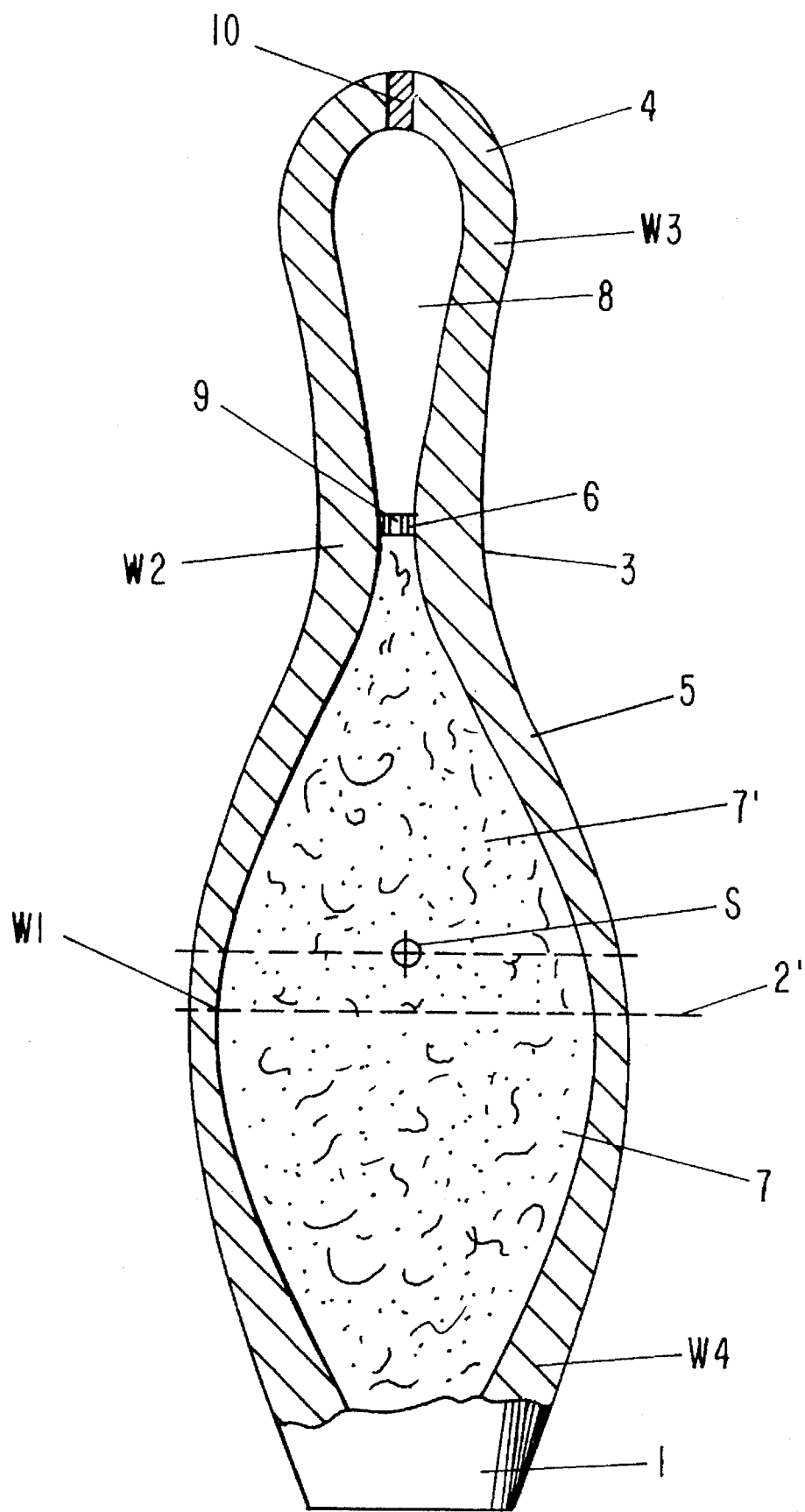

HOLLOW PLASTIC PIN WITH VARYING WALL THICKNESS

BACKGROUND OF THE INVENTION

The present invention relates to a plastic pin, including a bowling pin, for bowling lanes, and also relates to a method of making such a plastic pin. The pin has a hard shell that surrounds a core of cellular and/or porous material, preferably a thermoplastic material. In the lower region of the pin, the shell has a bulging portion, thereabove a neck-like reduced diameter portion, and thereabove an again slightly wider head.

The difficulty with pins of this type is to achieve the prescribed position of the center of gravity and hence the desired tipping characteristic of the pin.

It is therefore an object of the present invention, for pins of the aforementioned general type, to be able to achieve the prescribed tipping characteristics of pins without thereby negatively impacting the strength and the durability of the pin.

BRIEF DESCRIPTION OF THE DRAWING

This object, and other objects and advantages of the present invention, will appear more clearly from the following specification in conjunction with the accompanying schematic drawing, which is a cross-sectional view through one exemplary embodiment of the inventive pin.

SUMMARY OF THE INVENTION

The pin of the present invention is characterized primarily in that the wall thickness of the shell increases gradually both upwardly and downwardly from a region of the greatest diameter in such a way that the thickness of the shell in the lower portion of the bulging portion on the one hand and in the reduced diameter portion as well as the head on the other hand is greater than the wall thickness of the shell in the region of the greatest diameter. The porous and/or cellular core of the pin is expediently provided and disposed in such a way that it fills the shell only to about the vicinity of the reduced diameter portion such that above the reduced diameter portion of the shell a chamber that is free of core material is provided. Filling the shell in this manner with the core material can be achieved by providing a transverse member within the shell; however, this partitioning could conceivably also be achieved by a particular reduced diameter in the interior of the shell.

It has been shown that the inventively embodied pin exhibits the desired tipping characteristic and ensures a relatively precise positioning of the center of gravity of the pin.

The method of the present invention is characterized primarily by introducing the core plastic, which contains expanding agent, into the plastic shell for filling at least a portion of the hollow interior thereof by expansion of the core plastic, wherein the core plastic is introduced at such a temperature that the inner surface of the plastic shell is softened at least at some locations by contact with the introduced core plastic to thereby effect fusion or at least a positive interconnection between the plastic of the shell and the introduced core plastic.

Further specific features of the present invention will be described in detail subsequently.

DESCRIPTION OF PREFERRED EMBODIMENTS

Referring now to the drawing in detail, the pin has a base 1 that is provided with a recess for centering and placing the pin upright in a pin unit or setter. Disposed above the base 1 is a bulging portion 2, above which is provided a neck or reduced diameter portion 3, and finally at the upper end of the pin a head 4. The center of gravity "s" of the pin is generally disposed slightly above the largest diameter portion 2' of the bulging portion 2 that is normally struck by bowling balls and the like.

The outer contour of the pin is determined by a shell 5 that is made of a hard, impact resistant plastic, for example a plastic having a polyamide base and being produced by blow molding.

In the vicinity of the smallest inner diameter of the neck 3, a horizontal transverse member 6 extends through the hollow interior of the shell 5. The central portion of the transverse member 6 is provided with a hole 9 having a diameter of about 4–6 mm. In this way, the hollow interior of the pin is divided into a lower chamber 7 and an upper chamber 8.

A further central hole 10 is provided at the top of the head 4 of the shell 5. The two holes 9, 10 serve for venting when a plastic, for example a plastic having a propylene base, and to which is added an expanding agent, is introduced into the chamber 7 from below. The plastic can also have added thereto glass fibers or the like. The plastic 7', which fills the chamber 7 and provides the core of the pin, should have a specific weight of about 0.4–0.8 kg/dm$^3$. The transverse member 6 prevents the plastic 7' that is introduced into the chamber 7 from also passing into the chamber 8. After the pin has been finished, the hole 10 at the top is closed off by a plastic.

Very critical to the tipping characteristic of the pin are the wall thicknesses of the shell 5.

In the region 2', the shell 5 has a wall thickness W1 of about 5–6 mm, with the wall thickness increasing gradually in the direction toward the reduced diameter portion 3 to a value W2 of about 8–18 mm, so that at this location an inside diameter of the interior chamber of about 10 mm remains. In a direction toward the head 4 and in the entire region of the head the wall thickness W3 is about 10–12 mm. Starting again from the region 2', the wall thickness increases gradually in a direction toward the base 1 to the value W4 of about 12 mm. Viewed as a whole, roughly speaking the wall thicknesses essentially double proceeding upwardly and downwardly from the region 2'.

For purposes of partitioning the interior of the pin, it has proven to be expedient to dispose the transverse member 6 in the reduced diameter portion 3. Although in so doing a relatively large chamber 8 results, this is again compensated for by the wall thicknesses W3 provided in the region of the head 4.

For the cohesion and durability of the pin body, it is particularly important to effect the aforementioned method of manufacture by introducing the plastic, which might contain glass fibers and to which is added an expanding agent, at such a temperature of the plastic that the plastic fuses to the inner surface of the shell 5. Under these conditions, the material of the shell and the aforementioned core material are fused together, i.e. are positively interconnected.

The present invention is, of course, in no way restricted to the specific disclosure of the specification and drawing, but also encompasses any modifications within the scope of the appended claims.

What I claim is:

1. A plastic pin, including a bowling pin, for bowling lanes, comprising:

A hard shell that is hollow and has a lower bulging portion that is filled with a core of cellular or porous material and that has a maximum diameter, thereabove a neck-like reduced diameter portion and thereabove an again slightly wider head, and wherein said shell has a wall thickness that starting at said maximum diameter of said bulging portion increases gradually both upwardly toward said reduced diameter portion and downwardly toward a base of said pin.

2. A pin according to claim 1, wherein said wall thickness of said shell at said neck-like reduced diameter portion and approaching said base is essentially twice the value that exists at said greatest diameter part of said bulging portion.

3. A pin according to claim 1, wherein a wall thickness of said shell in the vicinity of said reduced diameter portion is slightly greater than a wall thickness in the vicinity of said head.

4. A pin according to claim 1, wherein a wall thickness in the vicinity of said base of said pin is slightly less than a wall thickness in the vicinity of said reduced diameter portion.

5. A pin according to claim 1, wherein said shell, in the vicinity of said reduced diameter portion, is provided with a transverse member that divides a hollow interior of said pin into two chambers, including a lower chamber that is filled with said material that forms said core, and an upper chamber that for all practical purposes is unfilled and contains merely air.

6. A pin according to claim 1, wherein said shell has a wall thickness of about 5–6 mm in said greatest diameter part of said bulging portion, a wall thickness of about 8–18 mm in said reduced diameter portion, a wall thickness of about 10–12 mm in said head and a wall thickness of about 12 mm in the vicinity of said base of said pin.

7. A pin according to claim 5, wherein said transverse member is provided with a venting hole that can be closed off.

8. A pin according to claim 7, wherein said head is provided with a closable venting hole.

* * * * *